United States Patent
Guinaldo Fernandez et al.

(10) Patent No.: US 9,751,612 B2
(45) Date of Patent: Sep. 5, 2017

(54) MULTIFUNCTIONAL COMPOSITE MATERIAL INCLUDING A VISCOELASTIC INTERLAYER

(71) Applicant: Airbus Operations, S.L., Madrid (ES)

(72) Inventors: Enrique Guinaldo Fernandez, Geafe Madrid (ES); Tamara Blanco Varela, Getafe Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 410 days.

(21) Appl. No.: 13/929,166

(22) Filed: Jun. 27, 2013

(65) Prior Publication Data

US 2014/0011006 A1 Jan. 9, 2014

Related U.S. Application Data

(63) Continuation of application No. PCT/ES2011/070906, filed on Dec. 27, 2011.

(30) Foreign Application Priority Data

Dec. 27, 2010 (ES) .................................. 201031950

(51) Int. Cl.
*B32B 37/00* (2006.01)
*B29C 65/00* (2006.01)
(Continued)

(52) U.S. Cl.
CPC ................. *B64C 1/40* (2013.01); *B32B 5/022* (2013.01); *B32B 5/024* (2013.01); *B32B 5/12* (2013.01);
(Continued)

(58) Field of Classification Search
CPC .. B32B 3/12; B32B 5/024; B32B 5/10; B32B 5/12; B32B 5/26; B32B 7/02;
(Continued)

(56) References Cited

U.S. PATENT DOCUMENTS 4,732,803 A * 3/1988 Smith, Jr. ................. B32B 7/02
109/49.5
4,879,165 A 11/1989 Smith
(Continued)

FOREIGN PATENT DOCUMENTS

EP EP 0 730 951 9/1996
EP 1 500 494 1/2005
(Continued)

*Primary Examiner* — Jacob T Minskey
*Assistant Examiner* — Matthew Hoover
(74) *Attorney, Agent, or Firm* — Jenkins, Wilson, Taylor & Hung, P.A.

(57) ABSTRACT

Provided is a structure of composite material, comprising a continuous first layer of composite material, a second layer of viscoelastic material, and a continuous impact-protection third layer. The first layer is formed by structural components in the form of a matrix and fibers. The second layer of viscoelastic material is added on top of the first layer and said second layer can be continuous or non-continuous. If a non-continuous second layer is used, elongate, circular or square cavities are arranged inside the layer. Optionally, reinforcements comprising carbon nanofibers or nanotubes are provided in either of the first and second layers. The third layer of impact-protection material is added in a continuous manner on top of the second layer, the third layer forming the outermost layer of the composite material. In addition, this third layer is electrically conductive. The composite material has noise attenuation, impact resistance and electric conductivity properties.

13 Claims, 2 Drawing Sheets

(51) Int. Cl.

| | |
|---|---|
| *F41H 1/00* | (2006.01) |
| *B32B 3/00* | (2006.01) |
| *B32B 5/00* | (2006.01) |
| *B32B 7/00* | (2006.01) |
| *B32B 15/00* | (2006.01) |
| *B32B 27/00* | (2006.01) |
| *B64C 1/00* | (2006.01) |
| *B64C 3/00* | (2006.01) |
| *B64C 1/40* | (2006.01) |
| *B32B 5/26* | (2006.01) |
| *B32B 7/02* | (2006.01) |
| *B32B 7/04* | (2006.01) |
| *B32B 5/02* | (2006.01) |
| *B32B 5/12* | (2006.01) |
| *B32B 7/12* | (2006.01) |

(52) U.S. Cl.
CPC ............... *B32B 5/26* (2013.01); *B32B 7/02* (2013.01); *B32B 7/045* (2013.01); *B32B 7/12* (2013.01); *B32B 2260/023* (2013.01); *B32B 2260/046* (2013.01); *B32B 2262/101* (2013.01); *B32B 2262/106* (2013.01); *B32B 2307/102* (2013.01); *B32B 2307/202* (2013.01); *B32B 2307/558* (2013.01); *B32B 2605/18* (2013.01); *Y10T 428/24851* (2015.01); *Y10T 428/24995* (2015.04); *Y10T 428/249951* (2015.04)

(58) Field of Classification Search
CPC  B32B 7/045; B32B 7/12; B32B 15/08; B32B 27/04; B32B 27/12; B32B 37/00; B29C 65/00; F41H 1/02; F01H 5/04; B64C 1/00; B64C 1/40; B64C 2001/0054; B64C 2001/0072; B64C 2001/0081; B64C 3/20; B64C 3/26
See application file for complete search history.

(56) References Cited

U.S. PATENT DOCUMENTS

| | | | |
|---|---|---|---|
| 4,937,125 A | | 6/1990 | Sanmartin et al. |
| 5,141,400 A | | 8/1992 | Murphy et al. |
| 6,114,050 A | * | 9/2000 | Westre ............. B32B 3/12 244/119 |
| 7,223,312 B2 | * | 5/2007 | Vargo ............. H05K 9/0084 156/307.7 |
| 7,571,493 B1 | * | 8/2009 | Purvis ............. F41H 1/02 2/2.5 |
| 2008/0083497 A1 | | 4/2008 | Dublineau et al. |
| 2008/0277057 A1 | * | 11/2008 | Montgomery ............. B32B 5/26 156/307.1 |
| 2010/0126796 A1 | * | 5/2010 | Kadowaki ............. B32B 15/08 181/207 |

FOREIGN PATENT DOCUMENTS

| | | |
|---|---|---|
| WO | WO 91/14556 | 10/1991 |
| WO | WO 02/24383 | 3/2002 |
| WO | WO 2008/115301 | 9/2008 |
| WO | WO 2008/147754 | 12/2008 |
| WO | WO 2010/077849 | 7/2010 |
| WO | WO 2010/079322 | 7/2010 |

\* cited by examiner

MULTIFUNCTIONAL COMPOSITE MATERIAL INCLUDING A VISCOELASTIC INTERLAYER

CROSS-REFERENCE TO RELATED APPLICATION

This application is a continuation of and claims priority to PCT Application Serial No. PCT/ES2011/070906 filed Dec. 27, 2011 which claims the benefit of the filing date of Spanish Application Serial No. P201031950 filed Dec. 27, 2010 the entire disclosures of which are hereby incorporated herein by reference.

TECHNICAL FIELD

The present invention relates to a material having noise attenuation and impact resistance properties, and it also provides good electric conductivity. It also relates to the method of manufacturing a material with these features. The use thereof is of relevant interest in the aerospace industry.

BACKGROUND

The use of composite materials in the aerospace industry has considerably increased since the 1970s. Good mechanical resistance of said materials and their low weight have increased their use in different structural elements of aircraft, except in those areas subjected to high thermal loads.

The object of the invention is to provide a composite material that increases noise attenuation (for example, when it is used as structural material in the airframe of an aircraft), thereby improving passenger flight comfort. It also seeks to increase impact resistance as a structural material of the aircraft. Good electric conductivity is also sought as it allows a lightning bolt to easily exit the aircraft after striking it, for example. Said material comprises a structure which can be continuous for all its layers, made up of a base formed by a matrix and the corresponding fiber, at least one sheet of viscoelastic material, and at least one layer of impact-protection material.

Various forms of the combined use of composite and viscoelastic material are known in the state of the art, namely:

- technology known as embedded damping, consisting of using a sheet of viscoelastic material embedded in a composite material for absorbing and/or dissipating energy in intermediate-frequency vibrations (from 100 to 500 Hz);
- technology referred to as add-on damping, based on the use of an element connected to a layer of viscoelastic material that is adhered to a structural element for absorbing and/or dissipating energy in intermediate-frequency vibrations (from 100 to 500 Hz).

Various patent documents with a state of the art related to the object of the present invention are also known. International patent application WO 2008/147754 A1 describes a hybrid composite material for damping sounds and vibrations in aircraft. This material has various layers, a viscoelastic layer among them, which can have metal fibers to increase the damping effect.

International patent applications WO 2010/077849 A1, WO 2010/079322 A1 and WO 2008/115301 A2 relate to multilayer composite materials, including at least one viscoelastic layer or the introduction of elements with viscoelastic properties.

United States patent application US 2010/0126796 A1 relates to a multilayer composite material with damping properties, having a viscoelastic layer between other metallic layers.

Patent document EP 1,500,494 B1 discloses a composite material the structure of which has damping layers of viscoelastic material, and it relates to the manufacturing process thereof.

Patent document U.S. Pat. No. 6,114,050 A describes a titanium-polymer hybrid laminate that combines layers of composite material; in a preferred embodiment all the layers of composite material have the same orientation. The material is particularly applicable for supersonic civilian aircraft.

However, there is no known material in the state of the art like the material described herein in which all the aspects of this invention, such as noise attenuation, electric conductivity and impact resistance, are efficiently combined. Impact resistance must be understood as low, medium and high energy impact resistances. Low energy impacts are understood as those that are less than 50 J, representative of a tool falling on the material. Medium energy impacts are those comprised between 50 J and 3 kJ; typical examples are impacts of birds during flight. Finally, high energy impacts are those impacts that exceed 3 kJ, representative of the impact of ice fragments expelled by open rotor or propeller engine blades on the fuselage.

DESCRIPTION

The invention described herein discloses a cured or non-cured structure of composite material comprising a structural component in the form of a matrix, a structural component in the form of fiber, a layer of viscoelastic material and a layer of impact-protection material. The matrix and the fiber form a continuous first layer of the composite material. The layer of viscoelastic material is added in the form of a second layer on top of the first layer, formed by the previously mentioned matrix and fiber. The layer of impact-protection material is added in the form of a continuous third layer on top of the second layer of viscoelastic material. Said third layer of impact-protection material forms the outermost layer of the composite material and is furthermore electrically conductive.

The layer of viscoelastic material is added in the form of a continuous second layer on top of the first layer. In another configuration, the layer of viscoelastic material is added in the form of a non-continuous second layer on top of the first layer, having elongate, circular or square cavities.

In one embodiment of the invention, the composite material has reinforcements comprising carbon nanotubes in at least one of the first and second layers. In another embodiment, the composite material has reinforcements comprising carbon nanofibers in at least one of the first and second layers.

The matrix associated with the continuous first layer of the composite material is a thermostable compound; in another configuration said matrix is a thermoplastic compound.

On the other hand, the structural fibers used in the continuous first layer of the composite material are carbon fiber-reinforced polymers, CFRP, or glass fiber-reinforced polymers, GFRP.

The third layer of the composite material, which serves as an impact-protection material, is any of the following: a pure metal, a metal alloy, a metal oxide, or a cermet material.

The thickness of the second viscoelastic layer of the composite material is between 0.1 and 0.2 mm.

In turn, the third layer of the composite material has a maximum thickness equal to one third (33.33%) the total thickness of the composite material. On the other hand, said third layer of the composite material has a minimum thickness which is:
a) greater than 22% the total thickness of the composite material, or
b) greater than 0.8 mm,
the first of these two minimum requirements that is met being applied.

The invention also describes a method of manufacturing a structure of composite material comprising:
  a structural component in the form of a matrix,
  a structural component in the form of fiber,
  a layer of viscoelastic material,
  a layer of impact-protection material.

The matrix and the fiber are laminated by means of an automatic method, such as the automatic tape lay-up method or fiber placement method, the laminated part being subjected to an autoclave curing or setting cycle, a first layer of laminated material being obtained. Then a second layer of viscoelastic material is added. After that, a third layer of impact-protection material is added on top of the assembly of the second layer of viscoelastic material based on the first layer. Said third layer forms the outermost layer of the composite material, the third layer further being electrically conductive.

The second layer of viscoelastic material is obtained by means of either of the two following ways:

1) The viscoelastic material in the form of strips or bands, continuous or non-continuous woven or non-woven web is subjected to a process of pre-impregnation with a matrix of thermostable or thermoplastic resin, either combined with carbon or glass fiber, or alone. A pre-impregnated layer of viscoelastic material is thus obtained. Said pre-impregnated layer of viscoelastic material is deposited on the surface of the first layer of composite material by means of automatic lamination, such as by means of automatic tape lay-up or fiber placement. It is subsequently cured or set at the same time as the first layer, i.e., in the same curing or setting cycle, such that after that lamination and curing or setting process, the pre-impregnated layer of viscoelastic material becomes the second layer of viscoelastic material.

2) The non pre-impregnated viscoelastic material in the form of a continuous or non-continuous sheet is deposited directly on top of the non-cured first layer of composite material or after depositing an adhesive film on top of said layer, which cures at the same time i.e., in the same curing cycle, as the first layer of composite material. The sheet of viscoelastic material can be previously subjected to a surface treatment, such as APP (atmospheric pressure plasma) for example, to favor attachment with the first layer of composite material.

The impact-protection third layer is added on top of the second viscoelastic layer of the composite material by means of any of the following modes:
  by means of thermal spray deposition;
  by means of mechanical attachment, for example, by means of rivets;
  by means of bonding the third layer after previously preparing the surface thereof, for example by means of a descaling or anodizing process if the third layer is a metal sheet. The adhesive to be used for gluing the third layer may or may not be cured in the same curing cycle of the assembly formed by the first layer and the second layer. If it is cured in a different cycle, the cured or set assembly formed by the first layer and the second layer is subjected to a surface treatment prior to gluing, for example by means of sanding, use of a peelable, or APP (atmospheric pressure plasma) treatment.

BRIEF DESCRIPTION OF THE DRAWINGS

The invention can be easily understood in view of the content of the description in conjunction with the drawings, where reference numbers are used to show the different elements making up the invention.

Figure 1:
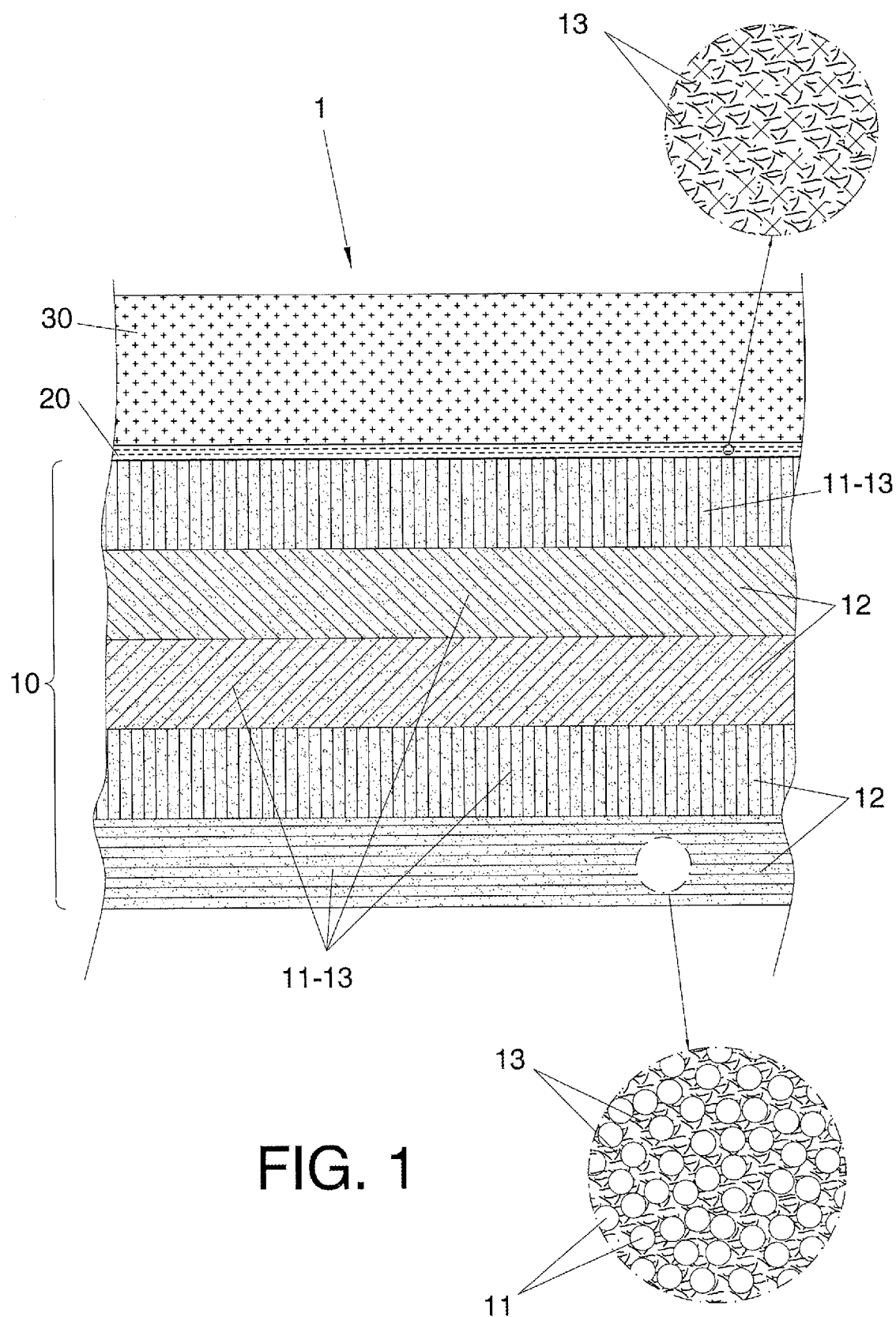
FIG. 1 is a section view of a generic sample of the material object of the invention.

A list of the different elements depicted in the drawings making up the invention is provided below: 1=structure of composite material; 10=first layer of the composite material; 11=matrix of the first layer; 12=structural fiber of the first layer; 13=carbon nanotube or nanofiber type reinforcement material; 20=second layer of the composite material; 21=viscoelastic material before impregnation; 22=matrix in which the viscoelastic material is impregnated; 23=fiber used with the viscoelastic material; 24=viscoelastic material after impregnation; 25=cavities in the viscoelastic material; 26=pressure roller; 27=reel of preimpregnated viscoelastic material; 30=third layer of the composite material.

DETAILED DESCRIPTION

Figure 2A:
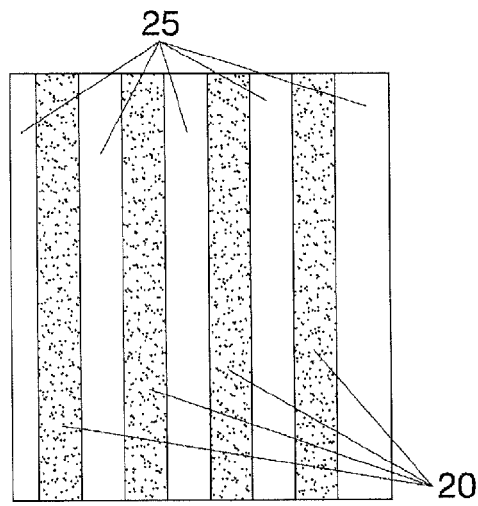
FIGS. 2a, 2b and 2c show various configurations of a non-continuous layer of viscoelastic material.
Figure 2B:
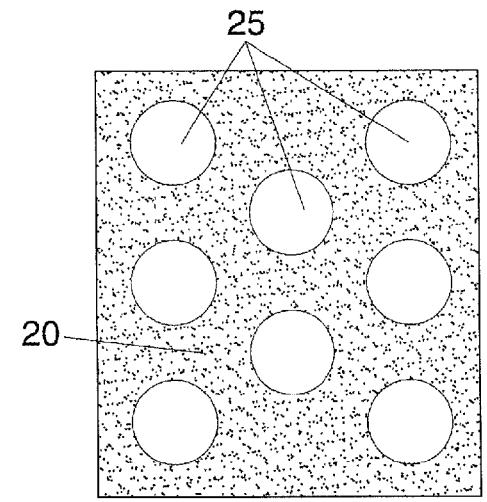
Figure 2C:
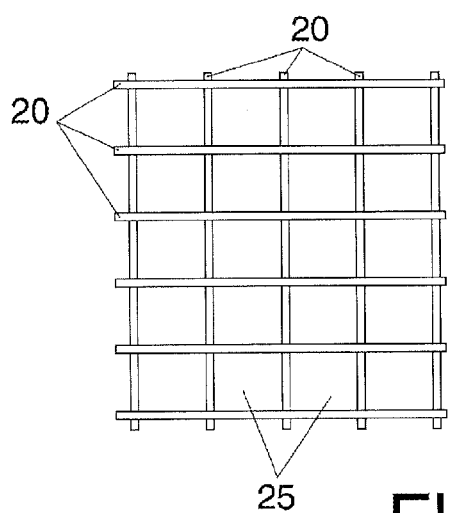

As previously indicated and as can be seen in FIG. 1, the invention consists of a structure of composite material (1), comprising a continuous first layer (10) made up of a structural component in the form of a matrix (11) and a structural component in the form of fiber (12). A second layer (20) of viscoelastic material is added on top of the first structural layer (10). This second layer (20) of viscoelastic material can be continuous or non-continuous, this second case being shown in the form of strips, or as a continuous element with holes, for example circular holes, or by means of a square grid, as shown in FIGS. 2a, 2b and 2c. The second layer (20) can further be combined with fibers (12) of the same type as the fibers of the first layer (10). There is also a third layer (30) of impact-protection material added in a continuous manner on top of the second layer (20) of viscoelastic material, said third layer (30) of impact-protection material forming the outermost layer of the composite material.

The continuous first layer (10) of the composite material (1) provides structural resistance and represents the main load path in structures made from this material. Said first layer (10) is made up of a matrix (11) offering continuity to the first layer (10), and of an assembly of structural fibers (12). Like in any composite material, the matrix (11) transmits mechanical stress to the structural fibers (12), thereby determining the mechanical properties of said first layer (10) of the composite material (1). It is also possible to introduce reinforcements (13) in the form of single- or multi-walled carbon nanotubes, or reinforcements (13) in the form of carbon nanofibers. It must be pointed out that FIG. 1 does not have to be drawn to scale and that it has been depicted in this way to more clearly understand the invention. The thicknesses of the different layers are not proportional to the actual configuration, particularly the second layer (20).

The matrix (11) of the continuous first layer (10) of the composite material (1) is a thermostable or thermoplastic compound. The thermoplastic or thermostable polymer matrix composite materials have good properties due to their high specific resistance. These materials are chosen because they were initially designed for aeronautical use, and said property is therefore crucial. It has been experimentally found that a thermoplastic matrix is more suitable for low energy impacts, i.e., impacts of less than 50 J. On the other hand, the structural fibers (12) used are typically CFRP or GFRP fibers, i.e., carbon fiber-reinforced polymers or glass fiber-reinforced polymers.

The fibers (12) are placed in the matrix (11) by means of establishing different layers of fibers (12). On the other hand, the fiber (12) is oriented depending on the mechanical properties that must be met (at 0°, ±45°, or 90°, among others possible geometries), as is known in the state of the art. For the sake of clarity, FIG. 1 shows the fibers (12) embedded in the matrix (11). The thickness of the continuous first layer (10) of the composite material (1) usually ranges between 1.6 and 6 mm, depending on the number of layers of fiber (12) it consists of and on the mechanical properties the composite material (1) must have. Nevertheless, in certain cases in which extreme loads have to be borne, the thickness of said first layer (10) can even be greater than the mentioned 6 mm. After positioning the different layers of fiber (12) and, where appropriate, the reinforcements (13), the fiber (12) becomes embedded in the matrix (11), the assembly is cured or set, depending on if the matrix (11) is a thermostable or thermoplastic matrix.

The second layer (20) of viscoelastic material is always placed between the first layer (10) of carbon fiber or glass fiber polymer material and the impact-protection third layer (30). This is done in order to take advantage of the difference in rigidity between the first layer (10) and the third layer (30) and to therefore improve vibration absorption efficiency. For correct acoustic operation, the interlaminar shear must be the highest in the second layer (20) of viscoelastic material. This is done by equalizing the rigidity of the layers (10), (30) that surrounding the layer (20) of viscoelastic material. The idea is to equalize the flexural rigidity (the product of the modulus of elasticity times the moment of inertia, E·I) of the first layer (10) of the laminate and the third layer (30), so that the interlaminar shear between the first layer (10) and third layer (30) is maximum. For example, when considering a virtually isotropic laminate with a modulus of elasticity of 55 GPa, combined with titanium with a modulus of elasticity of 106 GPa, if the titanium is distanced from the center of the laminate, its moment of inertia with respect to said center will be high. Therefore a relatively thin layer of titanium will be able to equalize the rigidity of the laminate.

The thickness of the viscoelastic second layer (20) must be in the range of tens of millimeters, preferably between 1 and 2 tens of millimeters, in order to be efficient on a multifunctional level, which involves low weight increase. On the other hand, the existence of the layer (20) of viscoelastic material allows re-distributing the energy received in the event of an impact in the third layer (30) of impact-protection material so that the polymer portion made up of the first layer (10) does not sustain damage. Furthermore, the second layer (20) serves as an insulation between the metal portion defined by the third layer (30) and the polymer portion defined by layer (10), preventing the occurrence of galvanic coupling, and therefore galvanic corrosion.

For purposes of the description of the present invention, viscoelastic material will be understood as any polymer with a glass transition temperature ($T_g$) that is less than −55° C. (218 K) and with a melting temperature ($T_m$) for a thermoplastic polymer or degradation temperature for a thermostable polymer that is greater than 180° C. (453 K). Said limits are clearly comprehensible in the use of materials applied in the aeronautical industry. The temperature of −55° C. (218 K) is approximately the temperature of the troposphere and stratosphere boundary, where commercial airplanes reach cruising conditions, i.e., it is the minimum temperature to which the airplane fuselage is subjected. On the other hand, the temperature of 180° C. (453 K) is the typical temperature reached in a curing cycle during the process of manufacturing a composite material.

The second layer (20) of viscoelastic material can be continuous or non-continuous, as seen in FIGS. 2a, 2b and 2c. In this case, the non-continuous sections are cavities (25) generated in the structure of the second layer (20). Said cavities (25) in the viscoelastic material can be in the form of bands or strips (FIG. 2a), circular (FIG. 2b), square or square grid-shaped (FIG. 2c).

The impact-protection third layer (30) is made up of any of the following components: a pure metal, a metal alloy, a metal oxide, or a composite material formed by ceramic and metallic materials (cermet). This third layer (30) provides energy absorption capacity in cases of low energy impact due to its high tenacity. On the other hand, it is sufficiently electrically conductive to prevent structural damage due to lightning striking or the circulation of electric current (electrical bonding, electrical grounding, . . . ). The thickness of the third layer (30) of impact-protection material ranges between 33.33% the total thickness of the composite material (1) and 0.8 mm according to the characteristics of the chosen materials.

One of the most distinguishable features of the invention is that it combines a continuous third layer (30) of metallic material with carbon fiber-reinforced polymers (CFRP) as the fiber (12) of the first layer (10), a minimum third layer (30) of metallic material (for example titanium) thereby being able to equalize the rigidity of the first layer (10) where the carbon fiber (which bears the structural load) is located, and to achieve good acoustic properties (for which purpose this balance is critical due to the passage of interlaminar shear). The purpose is so that both the first layer (10) and the outer layer (30) have the same rigidity. Therefore, the distribution of interlaminar shear, which tends to be parabolic and maximum at the center for a conventional laminate, will continue to be like that, said maximum being reached in the layer (20) of viscoelastic material.

On the other hand, another function of the second layer (20) of viscoelastic material is to stop delamination of the first layer (10) in the event of an impact in the third layer (30). It must be taken into account that said third layer (30) forms the outermost layer of the composite material (1), and serves as protection for the first layer (10) where the matrix (11) and the fiber (12) comprising carbon fiber-reinforced polymers (CFRP), which is what transmits the majority of the load, are located. The mechanism is such that the layer (20) of viscoelastic material acts like a "cushion" or "float" on top of which the third layer (30) rests. Said third layer (30) is a good energy absorbing mechanism, but furthermore, the viscoelastic layer (20) collaborates in the dissipation like another step, aiding to distribute the energy, such that when particle perpendicularly impacts the outer layer of the laminate its energy is distributed throughout the surface of the composite material (1). The mechanism is similar to a drumhead when it is hit.

Experience has shown that each of the three layers (10), (20), (30) must comply with a series of requirements in terms of material composition and thickness. These requirements can be defined in the following three points:

1) The thickness of the impact-protection third layer (30) must be:
   1a) at most equal to one third (33.33%) the total thickness of the composite material (1);
   1b) at least greater than 22% the total thickness of the composite material (1), or greater than 0.8 mm, the first of these two minimum requirements that is met being applied.
2) The thickness of the first layer (10) is conditioned by the design values to which the composite material (1) is going to be subjected, this thickness of the first layer (10) conditioning the thickness of the third layer (30), as mentioned above in point 1).
3) The thickness of the viscoelastic layer must be between 0.1 and 0.2 mm.

The method of manufacturing the composite material (1) is described below. As mentioned, the first layer (10) of the composite material (1) is made up of a matrix (11) and structural fibers (12) which can be, among others, carbon fiber-reinforced polymers (CFRP) or glass fiber-reinforced polymers (GFRP).

The method starts with the pre-impregnation of the fiber (12), which can be carbon fibers or glass fibers, as well as a matrix (11) consisting of a (thermostable or thermoplastic) resin. It is also possible to introduce reinforcements (13) in the form of single- or multi-walled carbon nanotubes, or reinforcements (13) in the form of carbon nanofibers. To that end, these reinforcements (13) are dispersed either in the resin or in one of its components prior to the process of pre-impregnating the fibers (12) with said resin. These reinforcements (13) are randomly arranged, being embedded in the matrix (11). Said reinforcements (13) can also optionally be incorporated in the structure of the viscoelastic second layer (20).

The fiber (12) and the matrix (11) are laminated by an automatic method (such as automatic tape lay-up, ATL, or fiber placement, FP), the laminated part being subjected to a suitable autoclave curing or setting cycle. The expression "suitable autoclave curing or setting cycle" must be understood as a specific time period in which heat and pressure are applied to the material for the purpose of permanently changing its mechanical properties by means of a controlled chemical reaction. Therefore, the first layer (10) of the composite material (1) is manufactured according to a usual method for manufacturing these materials.

Figure 3:
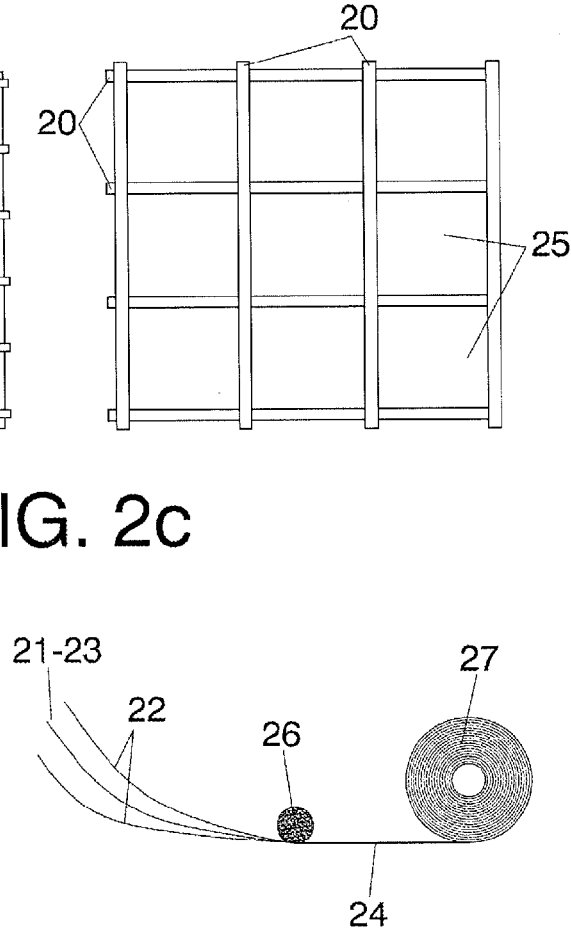
FIG. 3 shows a basic diagram of the method of manufacturing the material in the phase of generating the viscoelastic layer.

There are two alternatives for making the second layer (20) formed by viscoelastic material, the viscoelastic material (21) being able to be pre-impregnated in resin or not. According to the first alternative, the method starts with viscoelastic material (21) in the form of strips or bands, continuous or non-continuous woven or non-woven web. The viscoelastic material (21) is subjected to a process of pre-impregnation with a matrix (22) of thermostable or thermoplastic resin, as can be seen in FIG. 3. Said viscoelastic material (21) can previously be combined or woven with the same type of fiber as the fiber of the first layer (10), i.e., carbon or glass fiber (23). A pressure roller (26) compacts the viscoelastic material (21) with the matrix (22) and, where appropriate, with the fiber (23), a pre-impregnated layer of viscoelastic material (24) thus being obtained. This viscoelastic material (24) can be stored in reels (27). The mentioned pre-impregnated layer of viscoelastic material (24) is subsequently deposited on the surface of the first layer (10) of composite material by means of automatic lamination (such as automatic tape lay-up, ATL, or fiber placement, FP, for example). After that lamination process, the pre-impregnated layer of viscoelastic material (24) is cured or set at the same time as the layer 10, i.e., in the same curing or setting cycle, such that it becomes the second layer (20) of viscoelastic material.

A continuous or non-continuous sheet of viscoelastic material that is not pre-impregnated in resin can alternatively be used. This sheet is deposited directly on top of the non-cured first layer (10), or after depositing an adhesive film on top of said non-cured layer (10), which polymerizes at the same time as the first layer (10), i.e., in the same curing cycle. To favor the attachment of the dry viscoelastic sheet with the first layer (10), it can be previously subjected to a surface activation or preparation process, for example by means of the atmospheric pressure plasma treatment process, or APP process.

The impact-protection third layer (30) is subsequently added to the assembly of the composite material. There are various ways of adding the impact-protection third layer (30). One of them is by means of thermal spray deposition. This is an automatic surface coating process in which molten or hot materials are distributed over a surface in the form of a spray. The material to be deposited, which can be a metal, an alloy, a ceramic, a plastic or a composite material, is heated by electric means (plasma or arc) or chemical means (flaming combustion). A customized coating thickness (ranging from 20 micrometers to several millimeters) can be deposited by means of this technique on large surfaces and at a high speed compared to other methods. Different thermal spray deposition methods which can be used in this phase are known in the state of the art (such as cold spraying, plasma spraying, detonation spraying, flame spraying, high-velocity oxy-fuel coating spraying (HVOF), warm spraying, and wire arc spraying).

There are other ways to add the third layer (30) on top of the first two layers (10, 20). One of these alternative ways is by bonding the third layer (30); to that end, the surface of the third layer (30) undergoes a prior surface preparation. The preparation of the assembly of the metallic third layer (30) can be done by means of a descaling or anodizing process. The adhesive to be used for gluing the third layer (30) may or may not be cured in the same curing cycle of the assembly formed by the first layer and the second layer (10, 20). If it is cured in a different cycle, the cured or set assembly formed by the first layer and the second layer (10, 20) must be subjected to a surface treatment prior to gluing, for example by means of sanding, use of a peelable, or atmospheric pressure plasma treatment, APP.

Another option is the mechanical attachment of the third layer (30) on top of the other two layers (10, 20) by means of a physical connection, such as rivets for example.

The invention claimed is:

1. A method of manufacturing a structure of composite material comprising:
   a structural component in a form of a matrix;
   a structural component in a form of fiber;
   a layer of viscoelastic material, which comprises a polymer with glass transition temperature that is less than −55° C. and with a melting temperature for a thermoplastic polymer or degradation temperature for a thermostable polymer that is greater than 180° C.; and
   a layer of impact-protection material;
the method comprising:
   A) laminating the matrix and the fiber by an automatic method, such as an automatic tape lay-up method or fiber placement method, to produce a laminated part, the laminated part being subjected to an autoclave curing or setting cycle to produce a first layer comprising laminated material;

B) adding a second layer comprising viscoelastic material to produce an assembly comprising the second layer on the first layer;

C) adding a third layer comprising impact-protection material on top of the assembly comprising the second layer on the first layer, the third layer forming an outermost layer of the structure of composite material, and the third layer being electrically conductive;

wherein:

a thickness of the second layer is 0.1-0.2 mm, the third layer has a maximum thickness substantially equal to one-third of a total thickness of the structure of composite material, and the third layer has a minimum thickness greater than 22% of the total thickness of the structure of composite material, such that a flexural rigidity of the first layer and the third layer is equalized, so that the interlaminar shear between the first layer and the third layer is increased.

2. The method of manufacturing a structure of composite material according to claim 1, wherein the second layer is added such that:

B1) viscoelastic material in a form of strips or bands, continuous or non-continuous woven or non-woven web is subjected to a process of pre-impregnation with a matrix of thermostable or thermoplastic resin, either combined with carbon or glass fiber, or alone, to produce a pre-impregnated layer of viscoelastic material; and, B2) the pre-impregnated layer of viscoelastic material is deposited on a surface of the first layer of composite material by automatic lamination, such as by automatic tape lay-up or fiber placement; the pre-impregnated layer is subsequently cured or set at a same time as the first layer, i.e., in a same curing or setting cycle, such that after the automatic lamination and curing or setting process, the pre-impregnated layer comprises the second layer of viscoelastic material.

3. The method of manufacturing a structure of composite material according to claim 1, wherein the second layer comprises non-impregnated viscoelastic material in a form of a continuous or non-continuous sheet and is deposited either directly on top of a non-cured or non-set first layer of composite material or after depositing an adhesive film on the first layer, such that the second layer cures or sets in a same curing or setting cycle as the first layer of composite material.

4. The method of manufacturing a structure of composite material according to claim 3, wherein the second layer is previously subjected to a surface treatment, such as by atmospheric pressure plasma treatment, to enhance attachment with the first layer.

5. The method of manufacturing a structure of composite material according to claim 1, wherein the third layer is added on top of the second layer by thermal spray deposition.

6. The method of manufacturing a structure of composite material according to claim 1, wherein the third layer is mechanically attached on top of the second layer.

7. The method of manufacturing a structure of composite material according to claim 1, wherein the third layer is added on top of the second layer by bonding the third layer with an adhesive, the surface thereof having been previously prepared; a curing or setting of the adhesive is to be used for gluing the third layer.

8. The method of manufacturing a structure of composite material according to claim 7, wherein the adhesive is cured in the same curing or setting cycle of the assembly comprising the second layer on the first layer.

9. The method of manufacturing a structure of composite material according to claim 7, wherein the adhesive is cured in a cycle different from the curing or setting cycle of the assembly comprising the second layer on the first layer.

10. The method of manufacturing a structure of composite material according to claim 9, wherein the cured or set assembly comprising the second layer on the first layer is subjected to a surface treatment process prior to gluing, such as treatment by sanding, use of a peelable, or atmospheric pressure plasma treatment.

11. The method of manufacturing a structure of composite material according to claim 6, wherein the third layer is mechanically attached by rivets.

12. The method of manufacturing a structure of composite material according to claim 7, wherein the previous preparation of the surface of the third layer comprises a process of descaling or anodizing.

13. A method of manufacturing a structure of composite material comprising:

a structural component in a form of a matrix;

a structural component in a form of fiber;

a layer of viscoelastic material, which comprises a polymer with glass transition temperature that is less than −55° C. and with a melting temperature for a thermoplastic polymer or degradation temperature for a thermostable polymer that is greater than 180° C.; and a layer of impact-protection material;

the method comprising:

A) laminating the matrix and the fiber by an automatic method, such as an automatic tape lay-up method or fiber placement method, to produce a laminated part, the laminated part being subjected to an autoclave curing or setting cycle to produce a first layer comprising laminated material;

B) adding a second layer comprising viscoelastic material to produce an assembly comprising the second layer on the first layer;

C) adding a third layer comprising impact-protection material on top of the assembly comprising the second layer on the first layer, the third layer forming an outermost layer of the structure of composite material, and the third layer being electrically conductive;

wherein:

a thickness of the second layer is 0.1-0.2 mm, the third layer has a maximum thickness substantially equal to one-third of a total thickness of the structure of composite material, and the third layer has a minimum thickness greater than 0.8 mm, such that a flexural rigidity of the first layer and the third layer is equalized, so that the interlaminar shear between the first layer and the third layer is increased.

* * * * *